July 16, 1935.  L. HLADIK  2,008,449
DEVICE FOR DRAINING WATER FROM AUXILIARY ENGINES OF LOCOMOTIVES
Filed March 24, 1932
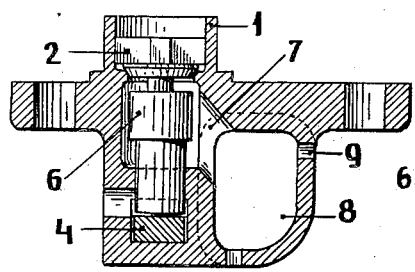
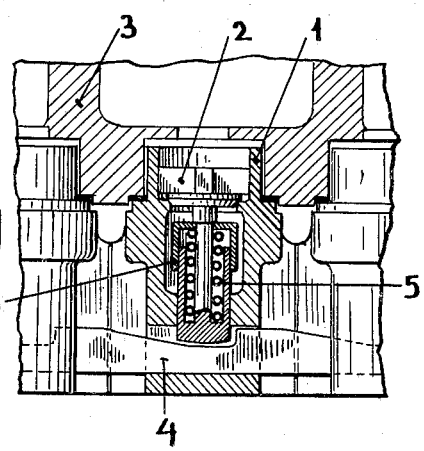
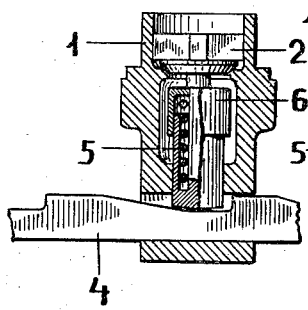 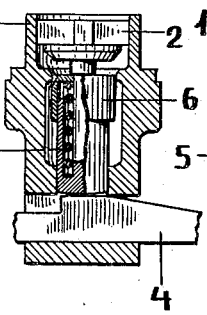 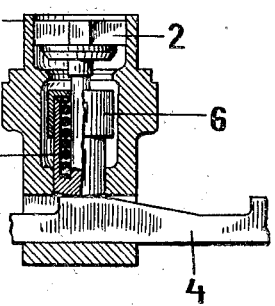
L. Hladik
INVENTOR
By: Marks & Clerk
ATTYS.

Patented July 16, 1935

2,008,449

UNITED STATES PATENT OFFICE 2,008,449

DEVICE FOR DRAINING WATER FROM AUXILIARY ENGINES OF LOCOMOTIVES

Ladislav Hladik, Pilzen, Czechoslovakia, assignor to Limited Company formerly the Skoda Works, Pilzen, Prague, Czechoslovakia, a corporation of Czechoslovakia Application March 24, 1932, Serial No. 601,003 In Czechoslovakia April 4, 1931

7 Claims. (Cl. 121—34)

Hitherto water draining devices similar to those in the locomotive itself have been employed in the auxiliary engines of locomotives. Such devices, however, possessed the disadvantage that the flow sectional area for the condensate was insufficient during winter frosts, particularly in districts with severe weather conditions. If the flow area of the water draining devices is adequately enlarged it often happens that, owing to the escape of steam, when the auxiliary engine is working on no load, such large pressure losses are sustained that the engine starts with difficulty and considerable quantities of steam are necessary for starting.

These disadvantages are completely removed by the water draining device for auxiliary engines of locomotives according to the present invention and the essence of the invention consists in the fact that means are provided which, on starting the auxiliary engine under conditions of no load, effect a partial opening of the flow area of the water draining device and, on coupling the auxiliary engine with the axle of the vehicle, effect a further increase in the flow area.

When starting the auxiliary engine on no load by means of auxiliary steam only small flow areas through the water draining devices are opened. During this light running all the steam spaces and both halves of the cylinders are thoroughly heated and the condensate has sufficient time to flow away through the small open flow areas of the water draining devices. Thereafter, as soon as the auxiliary engine has been coupled with the axle and the pistons of its steam engine have begun to move at a rate determined by the momentary speed of travel and the super-heated steam has been admitted into the steam spaces, the large flow areas of the water draining devices are opened, which areas have such a value that all further condensate can escape quite quickly.

The device according to the invention possesses the particular advantages that only a small amount of steam is necessary for starting the auxiliary engine when it is running on no load, and that the flow area can be so enlarged at a later stage that any quantity of condensate actually present can pass through it, even when the auxiliary engine is running coupled at its maximum speed.

In the water draining device according to the invention the steam in the space from which the water is to be drained may advantageously be employed for automatically effecting the alteration in the flow area of the water draining devices. In this way an important constructional simplification is obtained.

One constructional example of the invention is illustrated in the accompanying drawing in which Figs. 1 and 2 are vertical sections, taken from the front and one side respectively, of a water draining device constructed in the form of a valve.

Fig. 3 shows a similar water draining device in the closed position.

Fig. 4 shows the valve open, but with small flow area.

Fig. 5 shows the valve open with large flow area.

The valve casing 1 adjoins the chamber 3 which is to be drained and is sealed in known manner with respect thereto. In this casing are arranged a cut-off device 2 and a throttle member 6. The throttle member 6 is mounted, under the control of a spring 5, on the valve stem which carries the cut-off device 2, and the valve stem co-operates with and is controlled by a control rod 4.

The manner of operation of the device is as follows: If the auxiliary engine is working and there is no water present in its steam space, the water draining devices are closed, that is to say they are in the position shown in Figs. 1, 2 and 3 and the cut-off device is pressed against its seating in the casing 1 by the steam pressure in chamber 3, and the throttle member is held in its uppermost position by the spring 5.

On stopping the auxiliary engine the control rod 4 is slid to the right, so that its inclined surface lifts the cut-off device into the position shown in Fig. 4. The cut-off device is thereby opened; the throttle member 6 is, however, raised with it right into the narrow cross sectional portion of the valve casing beneath the seating. Consequently there remains only a comparatively narrow flow area between the outer circumference of the throttle member 6 and the inner circumference of the constricted portion of the casing 1.

When auxiliary steam is admitted into the auxiliary engine the pipes and the steam cylinders gradually heat up and the condensate flows out through the constricted flow area of the water draining devices. Since the pressure losses through so small a flow area are not important the auxiliary engine will run on no load with the admission of an inconsiderable quantity of steam, so that both sides of the steam cylinders are thoroughly heated.

The throttle device 6, as has been already mentioned, is pressed into its uppermost position by the spring 5. On increasing the pressure in the space from which the water is to be drained above a certain value the throttle member 6 is forced downwardly and opens the outlet flow area. This takes place as soon as the main supply of superheated steam is admitted into the space from which the water is to be drained. This forces the throttle member into the lowest position (Fig. 5) whereby a large flow area is provided which permits the immediate outflow of further condensate.

The above described extremely simple arrangement provides reliable protection for the auxiliary steam engine even in districts with extremely severe weather conditions.

Through the large flow area of the water draining devices the steam flows out with considerable velocity. Since the auxiliary engines of locomotives are placed as far beneath the vehicle as the clear structure gauge permits, the escaping steam not only stirs up dust but frequently even scatters the smaller stones of the permanent way. It has therefore been found advantageous to provide damping means on the water draining devices.

According to the invention this is carried out by connecting to the outlet of the valve, a throttle member 6 which regulates the flow area, and a damping chamber 8 with throttle openings 9.

I claim:

1. A liquid drain for steam engines comprising a casing, a valve seat therein, a valve having a stem, said valve being adapted to seat on one side of said valve seat, a throttle spaced from the valve and larger than the stem and normally entirely below the valve seat and on the other side of the valve seat from the valve but adapted to pass through the valve seat and cooperative therewith to both enlarge or contract the flow area through the valve, and a spring interposed between the valve stem and the throttle.

2. A device for draining liquid from steam engines comprising a casing adapted to be attached to an engine cylinder, said casing having therein a valve seat, a valve adapted to seat on one side of said seat, a throttle spaced from said valve and cooperative with said valve seat to enlarge or contract the flow area therethrough, said throttle, when the valve is closed, being normally below the plane of the valve seat and movable therethrough, and a spring interposed between the valve stem and the throttle.

3. A liquid drain from a steam engine comprising a valve casing adapted to be attached to the engine, said casing having a valve seat therein, a valve adapted to seat on one side thereof, said valve having a stem rigid therewith and much smaller in diameter than the valve, said stem projecting through the valve opening and having thereon a throttle larger in diameter than the stem and spaced from said valve, being normally entirely below the plane of the valve seat and movable therethrough, and a spring interposed between the valve stem and the throttle.

4. A draining device for a steam cylinder comprising a casing adapted to be attached to the cylinder, a valve and valve seat in the casing, said casing having a chamber communicating therewith through an opening in its side wall below the valve seat, said valve having a stem and a throttle larger in diameter than the stem, said throttle being spaced from the valve and the wall of the chamber, said throttle being adapted to cooperate with said valve seat to expand the flow area through the valve opening and also to contract the flow area as it rises and falls relative to the plane of the valve seat and a spring interposed between the valve stem and the throttle whereby when there is a low working pressure in the steam cylinder or when there is no pressure therein, the said throttle allows of a small flow area of the main water draining valve and increases the flow area when there is a higher working pressure in the cylinder.

5. A liquid drain comprising a casing, a valve seat and a valve adapted to seat on one side of said seat, a throttle spaced from the valve and on the other side of said seat when the valve is closed, said casing having a chamber therein below the valve seat larger in diameter than said throttle, the walls of said chamber having an outlet and an auxiliary chamber communicating with the chamber around the throttle, and a spring interposed between the valve stem and the throttle to urge the throttle towards the valve seat.

6. A liquid drain from a steam cylinder comprising a casing, a valve seat therein, a valve adapted to contact one side of said seat, said valve having a stem extending through the valve opening and a spring enclosing the stem, a throttle surrounding the stem and spaced from the valve and a spring interposed between the valve stem and the throttle whereby the throttle is below the valve seat when the valve is closed and is cooperative with the valve seat to restrict and also to enlarge the flow therethrough in accordance with the distance of the throttle from the valve seat whereby when there is a low working pressure in the steam cylinder or when there is no pressure therein, the said throttle allows of a small flow area of the main water draining valve and increases the flow area when there is a higher working pressure in the cylinder and means to open the valve.

7. A draining device for a steam cylinder comprising a casing adapted to be attached to the cylinder, a valve seat in the casing, a valve to rest on one side of the valve seat, said valve having a stem of smaller diameter than the valve, said casing having a chamber below the valve seat of greater diameter than the diameter of the inner periphery of the valve seat and a throttle on said stem spaced from the valve and adapted to pass through the opening through the valve seat and a spring interposed between the valve stem and the throttle whereby when there is a low working pressure in the steam cylinder or when there is no pressure therein, the said throttle allows of a small flow area of the main water draining valve and increases the flow area when there is a higher working pressure in the cylinder.

LADISLAV HLADIK.